United States Patent
Nishikawa et al.

(10) Patent No.: US 10,471,660 B2
(45) Date of Patent: Nov. 12, 2019

(54) MANUFACTURING METHOD OF BONDING STRUCTURE AND BONDING STRUCTURE

(71) Applicant: OMRON Corporation, Kyoto (JP)

(72) Inventors: Kazuyoshi Nishikawa, Ritto (JP); Akio Sumiya, Kusatsu (JP); Satoshi Hirono, Kusatsu (JP); Tomoyuki Hakata, Uji (JP)

(73) Assignee: OMRON Corporation, Kyoto (JP)

( * ) Notice: Subject to any disclaimer, the term of this patent is extended or adjusted under 35 U.S.C. 154(b) by 97 days.

(21) Appl. No.: 15/327,658

(22) PCT Filed: Aug. 17, 2015

(86) PCT No.: PCT/JP2015/073041
§ 371 (c)(1),
(2) Date: Jan. 20, 2017

(87) PCT Pub. No.: WO2016/027776
PCT Pub. Date: Feb. 25, 2016

(65) Prior Publication Data
US 2017/0210058 A1    Jul. 27, 2017

(30) Foreign Application Priority Data

Aug. 22, 2014  (JP) .................. 2014-169279

(51) Int. Cl.
*B29C 65/16* (2006.01)
*B23K 26/324* (2014.01)
(Continued)

(52) U.S. Cl.
CPC .............. *B29C 65/16* (2013.01); *B23K 26/21* (2015.10); *B23K 26/324* (2013.01); *B23K 26/57* (2015.10);
(Continued)

(58) Field of Classification Search
CPC .................................................... B29C 65/16
See application file for complete search history.

(56) References Cited

U.S. PATENT DOCUMENTS

| 4,786,445 A * | 11/1988 | Portnoy | B29C 65/1635 264/1.37 |
| 8,816,246 B2 * | 8/2014 | Murison | B23K 26/0622 219/121.71 |
| 2009/0309201 A1 * | 12/2009 | Morita | H01L 23/49503 257/676 |

FOREIGN PATENT DOCUMENTS

| CN | 101795845 | 8/2010 |
| CN | 102712136 | 10/2012 |

(Continued)

OTHER PUBLICATIONS

"Office Action of China Counterpart Application," dated May 3, 2018, with English translation thereof, p. 1-p. 15.
(Continued)

*Primary Examiner* — Daniel H Lee
(74) *Attorney, Agent, or Firm* — JCIPRNET

(57) ABSTRACT

A bonding structure manufacturing method for manufacturing a bonding structure in which a first member and a second member are bonded is provided with: a step for forming a perforation with an opening in the surface of the first member and forming a protrusion that protrudes into the inner circumferential surface of the perforation; a step for disposing the region of the first member where the perforation is formed adjacent to the second member; and step for filling and curing the second member in the perforation of the first member by irradiating a laser on the region of the first member where the perforation is formed from the second member side.

8 Claims, 7 Drawing Sheets

(51) Int. Cl.
*B23K 26/21* (2014.01)
*B23K 26/57* (2014.01)
*B29C 65/00* (2006.01)
*B29K 105/00* (2006.01)

(52) U.S. Cl.
CPC ...... *B29C 65/1616* (2013.01); *B29C 65/1635* (2013.01); *B29C 65/1661* (2013.01); *B29C 66/0246* (2013.01); *B29C 66/1122* (2013.01); *B29C 66/30325* (2013.01); *B29C 66/43* (2013.01); *B29C 66/8322* (2013.01); *B29C 65/1683* (2013.01); *B29C 66/71* (2013.01); *B29C 66/721* (2013.01); *B29C 66/7212* (2013.01); *B29C 66/7392* (2013.01); *B29C 66/7394* (2013.01); *B29C 66/73921* (2013.01); *B29C 66/73941* (2013.01); *B29C 66/742* (2013.01); *B29C 66/7422* (2013.01); *B29C 66/74281* (2013.01); *B29C 66/74283* (2013.01); *B29C 66/919* (2013.01); *B29C 66/939* (2013.01); *B29K 2105/0079* (2013.01)

(56) References Cited

FOREIGN PATENT DOCUMENTS

| CN | 102939184 | 2/2013 | | |
|---|---|---|---|---|
| CN | 103009626 | 4/2013 | | |
| CN | 103057117 | 4/2013 | | |
| CN | 103071923 | 5/2013 | | |
| EP | 3184233 | 6/2017 | | |
| EP | 3184295 | 6/2017 | | |
| JP | S60-212329 | 10/1985 | | |
| JP | S60-212330 | 10/1985 | | |
| JP | 62064528 A | * 3/1987 | ......... | B29C 37/0085 |
| JP | S62-064528 | 3/1987 | | |
| JP | 2008-162288 | 7/2008 | | |
| JP | 2009302209 | 12/2009 | | |
| JP | 2013058739 | 3/2013 | | |
| JP | 2014-159133 | 9/2014 | | |
| KR | 20140095514 | 8/2014 | | |
| WO | 2011086984 | 7/2011 | | |
| WO | 2016125594 | 8/2016 | | |
| WO | 2016125595 | 8/2016 | | |
| WO | 2016143521 | 9/2016 | | |
| WO | 2016143586 | 9/2016 | | |

OTHER PUBLICATIONS

"Office Action of Korea Counterpart Application," dated Jan. 24, 2018, with English translation thereof, p. 1-p. 11, in which the listed reference was cited.
"Office Action of China Counterpart Application," with English translation thereof, dated Jul. 16, 2018, p. 1-p. 15.
"Search Report of Europe Counterpart Application", dated Mar. 16, 2018, p. 1-p. 8, in which the listed references were cited.
Office Action of China Counterpart Application, with English translation thereof, dated Jan. 31, 2019, pp. 1-15.

* cited by examiner

MANUFACTURING METHOD OF BONDING STRUCTURE AND BONDING STRUCTURE

CROSS REFERENCE TO RELATED APPLICATION

This application is a 371 application of the international PCT application serial no. PCT/JP2015/073041, filed on Aug. 17, 2015, which claims the priority benefit of Japan application no. 2014-169279, filed on Aug. 22, 2014. The entirety of each of the above-mentioned patent applications is hereby incorporated by reference herein and made a part of this specification.

BACKGROUND OF THE INVENTION

Field of the Invention

The present invention relates to a manufacturing method of a bonding structure and a bonding structure.

Description of Related Art

In the past, there is a known method for bonding a first member and a second member which contain different materials (for example, see patent document 1).

The patent document 1 discloses a bonding method: bonding a first member made as a resin material and a second member as a metal material through semiconductor laser. A boundary surface of the second member is worn into a concave convex shape through sandpaper, etc. Besides, by irradiating the semiconductor laser to the boundary surfaces of the first member and the second member, the semiconductor laser is absorbed on the boundary surface of the second member. Therefore, the first member nearby the boundary surface is molten, and the first member enters a concave convex part and is fixed. As a result, the first member and the second member are bonded.

PRIOR TECHNICAL DOCUMENTS

Patent Document

[Patent document 1] Japanese Patent No. 2008-162288 gazette

SUMMARY OF THE INVENTION

Problem to be Solved by the Present Invention

However, in a conventional bonding method, the semiconductor laser irradiating the boundary surface of the second member is easily reflected, therefore, energy of the laser is difficultly converted into heat effectively. Therefore, in the conventional bonding method, the laser must have high energy, as a result, the resin material easily has a problem of thermal deterioration (for example, burn marks, color change, deformation etc.).

In order to solve the problem, an objective of the present invention is to provide a manufacturing method of a bonding structure capable of inhibiting the thermal deterioration of the second member and a bonding structure.

Technical Means to Solve the Problem

The manufacturing method of a bonding structure of the present invention is a manufacturing method of a bonding structure bonded with a first member and a second member and comprises: a step for forming a perforation with an opening in the surface of the first member and forming a protrusion that protrudes into the inner circumferential surface of the perforation; a step for disposing the region of the first member where the perforation is formed adjacent to the second member; and step for filling and curing the second member in the perforation of the first member by irradiating a laser on the region of the first member where the perforation is formed from the second member side.

Through the constitution in this way, the irradiating laser for bonding is easily blocked inside the perforation by the protrusion, therefore, the energy of the laser for bonding is effectively converted into heat. Thus, the energy of the laser for bonding can be inhibited to a necessary minimal limit, and therefore the thermal deterioration of the second member can be inhibited.

In the manufacturing method of a bonding structure, optionally, the perforation is formed in a manner of connecting a first expanding part and a first reducing part, the protrusion is disposed on a surface side, the first expanding part faces to the bottom from the surface side in a depth direction and has an increased opening diameter, and the first reducing part faces to the bottom from the surface side in the depth direction and has a reduced opening diameter.

In the manufacturing method of a bonding structure, optionally, the perforation is formed in a manner of connecting a second reducing part, a second expanding part and a third reducing part, the protrusion is disposed in a position entering a bottom side, the second reducing part faces to the bottom from the surface side in a depth direction and has a reduced opening diameter, the second expanding part faces to the bottom from the surface side in a depth direction and has an increased opening diameter, and the third reducing part faces to the bottom from the surface side in the depth direction and has a reduced opening diameter.

In the manufacturing method of a bonding structure, the first member can be metal, thermoplastic resin or thermosetting resin.

In the manufacturing method of a bonding structure, the second member can be resin through which the laser can transmit.

The bonding structure of the present invention is manufactured through any mentioned manufacturing method of a bonding structure.

Through the constitution in this way, the irradiating laser for bonding is easily blocked inside the perforation by the protrusion, therefore, the energy of the laser for bonding is effectively converted into heat. Thus, the energy of the laser for bonding can be inhibited to a necessary minimal limit, and therefore the thermal deterioration of the second member can be inhibited.

Effects of the Invention

According to the manufacturing method of a bonding structure and the bonding structure, the thermal deterioration of the second member can be inhibited.

DESCRIPTION OF THE EMBODIMENTS

Hereinafter, the embodiments of the present invention are explained with reference to drawings.

(First Embodiment)

Firstly, a bonding structure 100 of a first embodiment of the present invention is explained with reference to FIG. 1.

Figure 1:
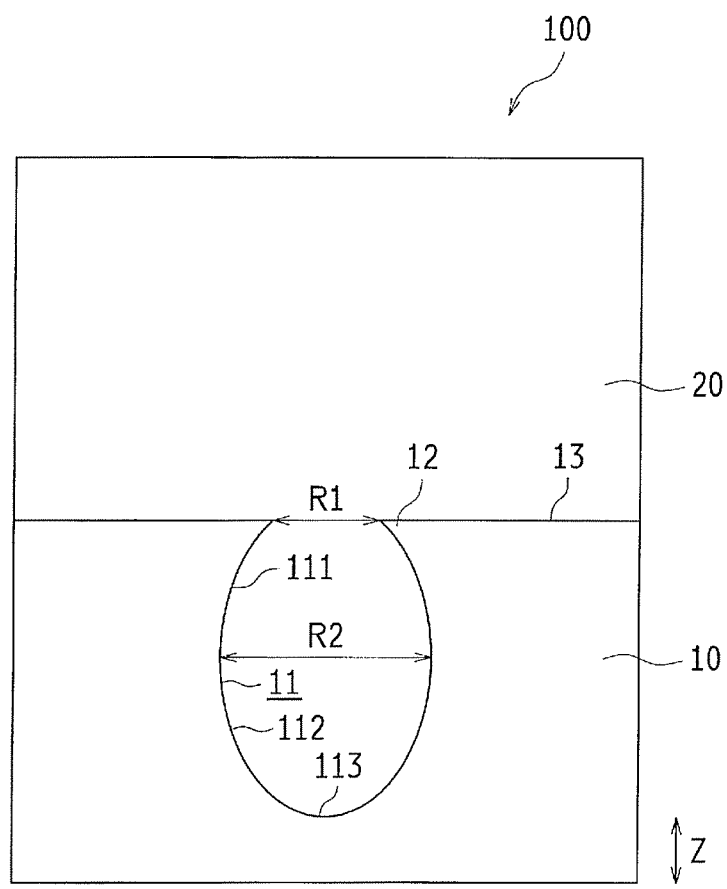
FIG. 1 is a schematic diagram of a profile of a bonding structure of a first embodiment of the present invention.

The bonding structure 100 as shown in FIG. 1 is bonded with a first member 10 and a second member 20, which contain different materials. On a surface 13 of the first member 10, a perforation 11 with an opening is formed, and on an inner circumferential surface of the perforation 11, a protrusion 12 that protrudes to the inside is formed. Besides, the second member 20 is filled into the perforation 11 of the first member 10 to be fixed. In addition, FIG. 1 is a schematic diagram expressing an enlarged bonding interference between the first member 10 and the second member 20, and in fact, there are a plurality of perforations, but only one perforation is shown in FIG. 1.

A material of the first member 10 is metal, thermoplastic resin or thermosetting resin. A material of the second member 20 is resin through which laser can transmit and which is the thermoplastic resin and thermosetting resin. Preferably, a transmittance of the second member 20 with a thickness of 3 mm is more than 15% for the irradiating laser during bonding mentioned below.

Examples of the metal are listed as follows: ferrous series metal, stainless steel series metal, copper series metal, aluminium series metal, magnesium series metal, and alloy of them. Besides, the metal can be metal forming bodies or zinc die-cast, aluminium die-cast, powder metallurgy, etc.

Examples of the thermoplastic resin are listed as follows: Polyvinyl Chloride (PVC), Polystyrene (PS), Acrylonitrile Styrene (AS), Acrylonitrile Butadiene Styrene (ABS), Polymethyl Methacrylate (PMMA), Polyethylene (PE), Polypropylene (PP), Polycarbonate (PC), m-Polyphenylene Ether (m-PPE), Polyamide 6 (PA6), Polyamide 66 (PA66), Polyacetal (POM), Polyethylene Terephthalate (PET), Polybutylene Terephthalate (PBT), Polysulfone (PSF), Polyarylate (PAR), Polyetherimide(PEI), Polyphenylene Sulfide (PPS), Polyethersulfone (PES), Polyether Ether Ketone (PEEK), Polyamideimide (PAI), Liquid Crystal Polymer (LCP), Polyvinylidene Chloride (PVDC), Polytetrafluoroethylene (PTFE), Polychlorotrifluroehtylene (PCTFE) and Polyvinylidene Fluoride (PVDF). Besides, Thermoplastic Elastomer (TPE) can also be used, and examples of the TPE are listed as follows: Thermoplastic Polyolefin (TPO) (olefin series), Thermoplastic Polystyrene (TPS) (styrene series), Thermoplastic Poly Ester Elastomer (TPEE) (ester series), Thermoplastic Polyurethane (TPU) (carbamate series), Thermoplastic Polyamide (TPA) (nylon series) and Thermoplastic Polyvinyl Chloride (TPVC) (chloroethylene series).

Examples of the thermosetting resin are listed as follows: Epoxy (EP), Polyurethane (PUR), Urea Formaldehyde (UF), Melamine Formaldehyde (MF), Phenol Formaldehyde (PF), Unsaturated Polyester (UP) and Silicone (SI). Besides, Fiber Reinforced Plastics (FRP) can also be used.

In addition, in the thermoplastic resin and thermosetting resin, an additive can be added. Examples of the additive are listed as follows: inorganic series fillers (glass fiber, inorganic salts, etc.), metal series fillers, organic series fillers, carbon fiber, etc.

The perforation 11 is an approximate round non-through hole when observed from a plane, and a plurality of perforations are formed on a surface 13 of the first member 10. An opening diameter R1 of the surface 13 of the perforation 11 is preferably more than 30 μm and lower than 100 μm because of two reasons: 1. if the opening diameter R1 is lower than 30 μm, then the irradiating laser for bonding cannot be fully blocked inside the perforation 11, and a conversion efficiency when the energy of the laser for bonding is converted into heat is reduced sometimes; 2. if the opening diameter R1 is more than 100 μm, then a quantity of the perforations 11 in per unit area is reduced, as a result, the conversion efficiency that the energy of the laser for bonding is converted into heat is reduced. Besides, a depth of the perforation 11 is more than 10 μm preferably because if the depth is lower than 10 μm, then the conversion efficiency when the energy of the laser for bonding is converted into heat is reduced sometimes.

Besides, an interval of the perforation 11 (a distance between the center of a prescribed perforation 11 and the center of another perforation 11 adjacent to the prescribed perforation 11) is preferably lower than 200 μm because if the interval of the perforation 11 is more than 200 μm, then the quantity of the perforation 11 in per unit area is reduced, and the conversion efficiency when the energy of the laser for bonding is converted into heat is reduced sometimes. In addition, an example of the lower limit of the interval of the perforation 11 is a distance that the perforations 11 are not depressed when overlapped. Besides, preferably, the intervals of the perforations 11 are the same because if the perforations 11 are equidistant, then the heat distribution is in isotropy when the laser for bonding irradiates.

Herein, the perforation 11 of the first embodiment is formed by a manner of connecting an expanding part 111 and a reducing part 112, the expanding part 111 faces to a bottom 113 from the side of a surface 113 in a depth direction (Z direction) and has an increased opening diameter, and the reducing part 112 faces to the bottom 113 from the side of the surface 13 in the depth direction and has a reduced opening diameter. The expanding part 111 is formed in a manner of curve expanding, and the reducing part 112 is formed in a manner of curve reducing. In addition, the expanding part 111 is one example of the "first expanding part" of the present invention, and the reducing part 112 is one example of the "first reducing part" of the present invention.

Besides, the expanding part 111 is disposed on the side of the surface 13, and the reducing part 112 is disposed on the side of the bottom 113. Therefore, in the perforation 11, an opening diameter (inner diameter) R2 of a boundary part between the expanding part 111 and the reducing part 112 is maximal, and the opening diameter R1 is smaller than the opening diameter R2. Therefore, the protrusion 12 is disposed on the side of the surface 13 of the first member 10. The protrusion 12 for example is formed by a whole length part all over a peripheral direction, and is shaped into a ring.

The perforation 11 for example is formed by irradiating the laser for processing. As a variety of the laser, an opinion of pulse oscillation can be considered, fiber laser, Yttrium Aluminum Garnet (YAG), Yttrium orthovanadate ($YVO_4$) laser, semiconductor laser, carbon dioxide laser and excimer laser can be selected, and if a wavelength of the laser is considered, then the fiber laser, the YAG laser, second harmonics of the YAG laser, $YVO_4$ laser and the semiconductor laser can be adopted preferably. In addition, about output of the laser, an irradiating diameter of the laser, a material variety of the first member 1 and a shape (for example thickness) of the first member 10, and the like need to be considered. For example, the upper limit of the output of the laser is 40 W . because if the output of the laser is more than 40 W, then the energy is high and the perforation 11 with the protrusion 12 is difficultly formed.

As an example of a device forming the perforation 11, a fiber laser marker MX-Z2000 or MX-Z2050 manufactured by Omron can be listed. This fiber laser marker can irradiate the laser, containing a plurality of sub-pulses, of one pulse. Therefore, the energy of the laser is easily concentrated in the depth direction, and is suitable for forming the perforation 11. Specifically speaking, when laser irradiates the first member 10, the first member 10 is locally molten, and thus formation of the perforation 11 is promoted. At this point, the laser contains a plurality of sub-pulses, therefore, the molten first member 10 is hard to scatter and can be easily accumulated nearby the perforation 11. Besides, when the formation of the perforation 11 is promoted, the molten first member 10 is accumulated in the perforation 11, and thus forms the protrusion 12. In addition, an irradiating direction of the laser for example is vertical relative to the surface 13, and an axis of the perforation 11 is vertical relative to the surface 13.

In addition, a processing condition of the fiber laser marker is preferably that one period of the sub-pulse is lower than 15 ns because if one period of the sub-pulse is more than 15 ns, then the energy is easily dissipated due to heat conduction, and the perforation 11 with the protrusion 12 is hard to form. In addition, one period of the sub-pulse is the total time of the irradiating time of once sub-pulse and an interval from the ending of irradiating of such sub-pulse to the starting of the irradiating of the next sub-pulse.

Besides, a processing condition of the fiber laser marker is preferably that the number of the sub-pulses of one pulse is more than 2 and lower than 50, because if the number of the sub-pulses is more than 50, then the unit output of the sub-pulses is reduced, and the perforation 11 with the protrusion 12 is hard to form.

Besides, the second member 20 is bonded with the surface 13 of the first member 10 with the perforation 11. The second member 20 for example is bonded with the first member 10 through laser melting. Therefore, the second member 20 is fixed under a condition of being filled into the perforation 11. In addition, the variety of the laser for bonding comprises fiber laser, YAG laser, YVO4 laser, semiconductor laser, carbon dioxide laser and excimer laser.

Such bonding structure 100 for example is suitable for a condition that a resin cover (not shown) is bonded with a metal case of a photoelectric sensor (not shown). At this point, the metal case is equivalent to the first member 10, and the resin cover is equivalent to the second member 20.

—the manufacturing method of the bonding structure—

Figure 2:
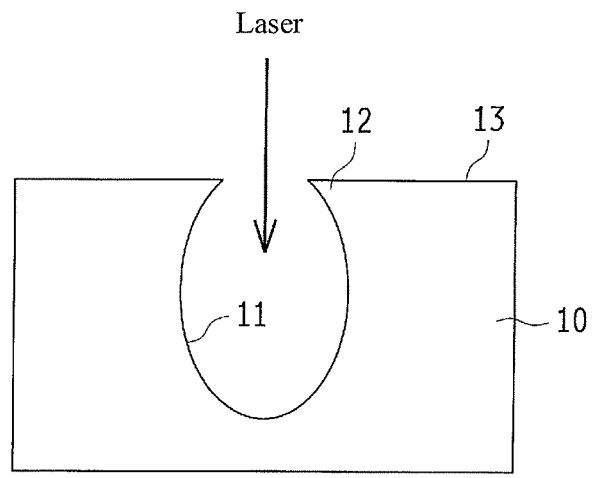
FIG. 2 is a diagram for explaining a manufacturing method of a bonding structure of FIG. 1 and is a schematic diagram for illustrating the status in which a perforation is formed on a first member.

Next, the manufacturing method of the bonding structure 100 of the first embodiment is explained with reference to FIGS. 1-3.

Firstly, a perforation 11 is formed on the surface 13 of the first member 10, and a protrusion 12 is formed at an inner circumferential surface of the perforation 11. The perforation 11 and the protrusion 12 for example are as shown in FIG. 2, and are formed by irradiating laser, containing a plurality of sub-pulses, of one pulse, and specifically, formed by the fiber laser marker MX-Z2000 or MX-Z2050.

Figure 3:
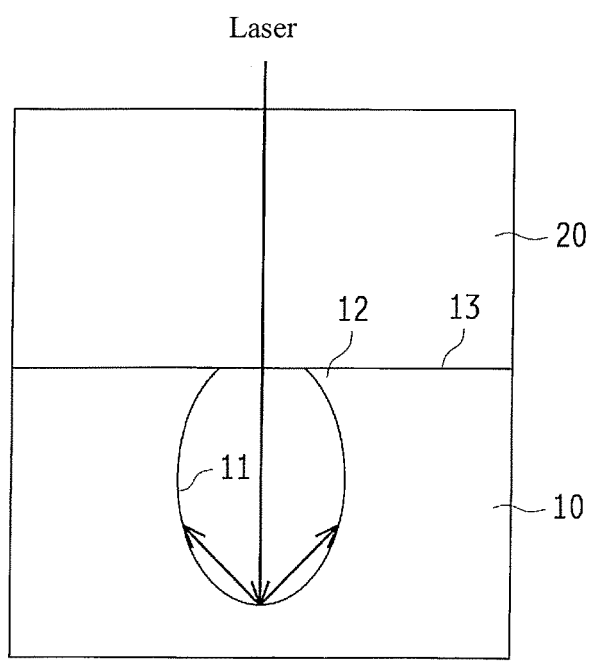
FIG. 3 is a diagram for explaining a manufacturing method of a bonding structure of FIG. 1 and is a schematic diagram for illustrating the status in which laser for bonding irradiates the side of a second member.

Afterwards, as shown in FIG. 3, the second member 20 is adjacently disposed on the surface 13 of the first member 10. Besides, under a status that the first member 10 and the second member 20 are pressed, the laser for bonding irradiates the surface 13 of the first member 10 from the second member side 20. Therefore, the energy of the laser is converted into heat on the surface 13 of the first member 10, and a temperature of the surface 13 of the first member 10 is risen. Therefore, the second member 20 nearby the surface 13 of the first member 10 is molten, and the second member 20 penetrates into the perforation 11. Afterwards, the second member 20 is fixed, therefore, the second member 20 is bonded with the first member 10, thus forming the bonding structure 100 (referring to FIG. 1).

Herein, in the first embodiment, by forming the protrusion 12, that protrudes to the inside, on the inner circumferential surface of the perforation 11, the irradiating laser for bonding is easily blocked inside the perforation 11 by the protrusion 12, therefore, the energy of the laser for bonding is effectively converted into heat. Thus, the energy of the laser for bonding can be inhibited to a necessary minimal limit, and therefore the thermal deterioration of the second member 20 can be inhibited.

In addition, when the first member 10 and the second member 20 are adjacently disposed, a laser absorption layer (not shown) can be disposed on the surface 13 of the first member 10 or the surface of the second member 20. A laser absorption material of a pigment series or dye series, which has absorptivity relative to a wavelength of the laser for bonding can be properly selected as the laser absorption layer. Due to the constitution in this way, the conversion efficiency that the energy for bonding is converted into heat is improved. In addition, in order to ensure the fallibility of the second member 20 into the perforation 11, a thickness of the laser absorption layer is preferably lower than 10 μm. Besides, the laser absorption layer can be blended in the second member in a range of meeting the laser transmittance required by the second member 20.

(Second Embodiment)

A bonding structure 200 of a second embodiment of the present invention is explained with reference to FIG. 4.

Figure 4:
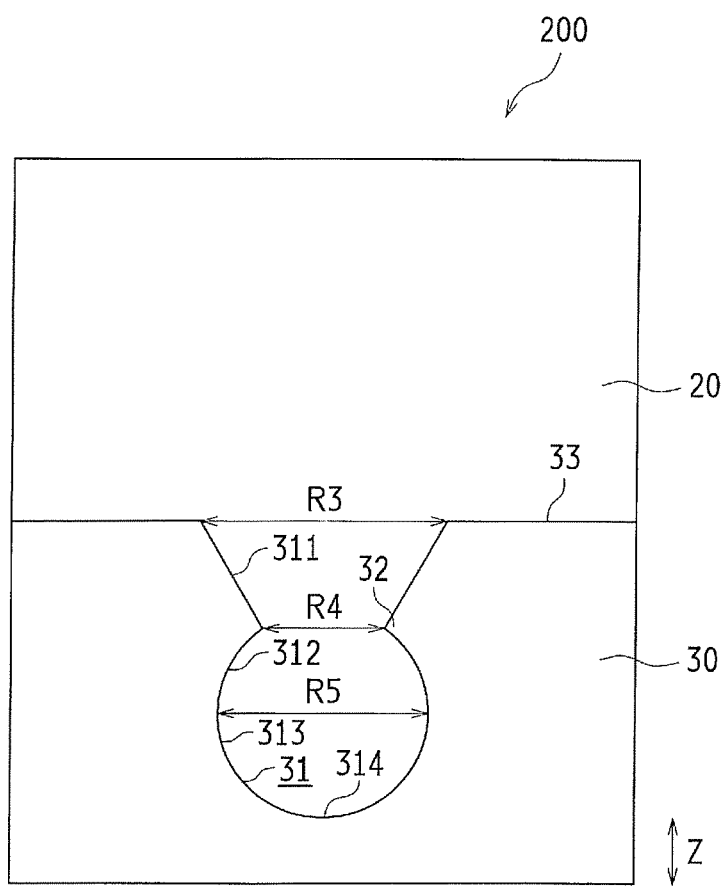
FIG. 4 is a schematic diagram of a profile of a bonding structure of a second embodiment of the present invention.

The bonding structure 200 is as shown in FIG. 4 and is bonded with a first member 30 and a second member 20, which contain different materials. On a surface 13 of the first member 30, a perforation 31 with an opening is formed, and on an inner circumferential surface of the perforation 31, a protrusion 32 that protrudes to the inside is formed. The second member 20 is filled into the perforation 31 of the first member 30 to be fixed.

The perforation 31 of the second embodiment is formed by a manner of connecting a reducing part 311, an expanding part 312 and a reducing part 313, the reducing part 311 faces to a bottom 314 from the side of a surface 33 in a depth direction (Z direction) and has a reduced opening diameter, the expanding part 312 faces to a bottom 314 from the side of the surface 33 in the depth direction and has an increased opening diameter, and the reducing part 313 faces to the bottom 314 from the side of the surface 33 in the depth direction and has a reduced opening diameter. The reducing part 313 is formed in a manner of linear reducing, the expanding part 312 is formed in a manner of curve expanding, and the reducing part 313 is formed in a manner of curve reducing. In addition, the reducing part 311 is one example of the "second reducing part" of the present invention, the expanding part 312 is one example of the "second expanding part" of the present invention, and the reducing part 313 is one example of the "third reducing part" of the present invention.

Besides, the reducing part 311, the expanding part 312 and the reducing part 313 are disposed from the side of the surface 33 to the bottom 314 in sequence. Therefore, in the perforation 31, an opening diameter (inner diameter) R4 of a boundary part between the reducing part 311 and the expanding part 312 is smaller than an opening diameter R3 of the surface 33 and an opening diameter R5 of a boundary part between the expanding part 312 and the reducing part 313. Therefore, the protrusion 32 is disposed in a position entering the side of the bottom 314. The protrusion 32 for example is formed by a whole length part all over a peripheral direction, and is shaped into a ring.

In addition, other constitutions of the first member 30 are same as the first member 10.

—the manufacturing method of the bonding structure—

Figure 5:
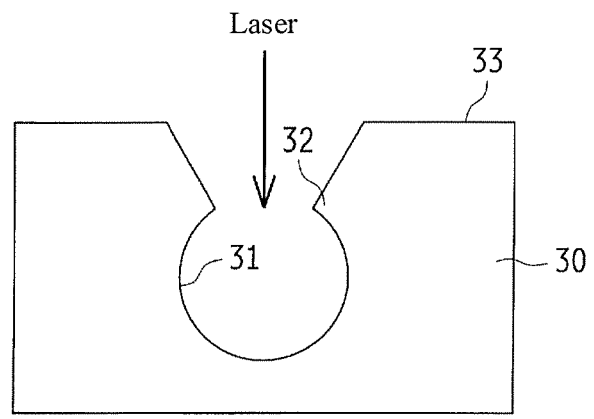
FIG. 5 is a diagram for explaining a manufacturing method of a bonding structure of FIG. 4 and is a schematic diagram for illustrating the status in which a perforation is formed on a first member.

Next, the manufacturing method of the bonding structure 200 of the second embodiment is explained with reference to FIGS. 4-6.

Firstly, a perforation 31 is formed on the surface 33 of the first member 30, and a protrusion 32 is formed at an inner circumferential surface of the perforation 31. The perforation 31 and the protrusion 32 for example are as shown in FIG. 5, and are formed by irradiating laser, containing a plurality of sub-pulses, of one pulse, and specifically, formed by the fiber laser marker MX-Z2000 or MX-Z2050. In addition, in the second embodiment, the difference from the first embodiment is that the protrusion 32 is disposed in a position entering the side of the bottom 314, but such difference for example is a difference caused by a material of the first material 30 or laser irradiating, etc.

Figure 6:
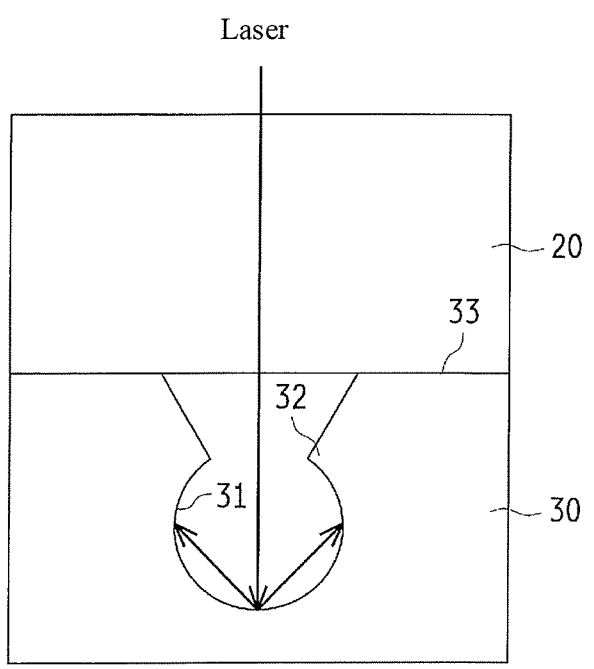
FIG. 6 is a diagram for explaining a manufacturing method of a bonding structure of FIG. 4 and is a schematic diagram for illustrating the status in which laser for bonding irradiates the side of a second member.

Afterwards, as shown in FIG. 6, the second member 20 is adjacently disposed on the surface 33 of the first member 30. Besides, under a status that the first member 30 and the second member 20 are pressed, the laser for bonding irradiates the surface 33 of the first member 30 from the second member side 20. Therefore, the energy of the laser is converted into heat on the surface 33 of the first member 30, and a temperature of the surface 33 of the first member 30 is risen. Therefore, the second member 20 nearby the surface 33 of the first member 30 is molten, and the second member 20 penetrates into the perforation 31. Afterwards, the second member 20 is fixed, therefore, the second member 20 is bonded with the first member 30, thus forming the bonding structure 200 (referring to FIG. 4).

Herein, in the second embodiment, by forming the protrusion 32, that protrudes to the inside, on the inner circumferential surface of the perforation 31, the irradiating laser for bonding is easily blocked inside the perforation 31 by the protrusion 32, therefore, the energy of the laser for bonding is effectively converted into heat. Thus, the energy of the laser for bonding can be inhibited to a necessary minimal limit, and therefore the thermal deterioration of the second member 20 can be inhibited.

In addition, when the first member 30 and the second member 20 are adjacently disposed, a laser absorption layer (not shown) can be disposed on the surface 33 of the first member 30 or the surface of the second member 20.

EXPERIMENT EXAMPLES

Figure 7:
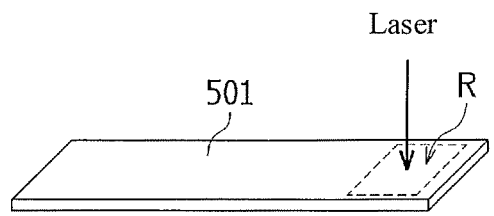
FIG. 7 is a space diagram illustrating a status, in which a first member is processed by laser, of an embodiment.
Figure 8:
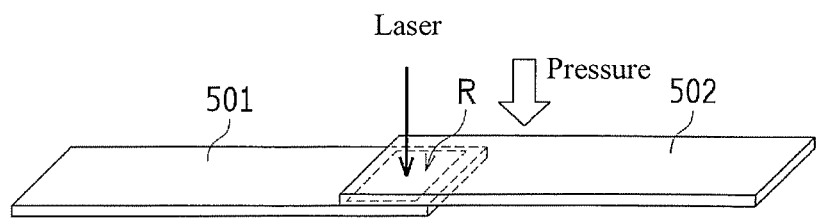
FIG. 8 is a space diagram illustrating a status, in which a second member is bonded with a first member by laser, of an embodiment.
Figure 9:
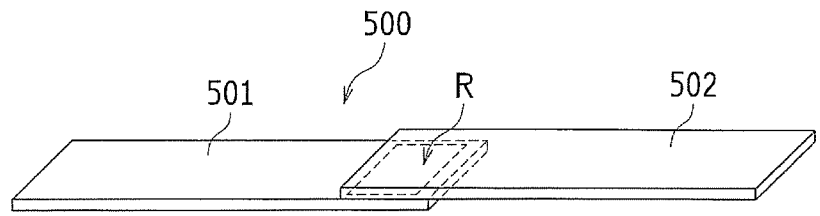
FIG. 9 is a space diagram illustrating a bonding structure of an embodiment.

Next, FIGS. 7-9 are used for explaining an experiment example 1 and an experiment example 2 performed to confirm effects of the second embodiment.

Experiment Example 1

In the experiment example 1, a bonding structure 500 (referring to FIG. 9) of the first embodiment corresponding to the second embodiment and a bonding structure of a comparison example 1 are manufactured and respective bonding strengths and an appearance of the second member are evaluated. The result is as shown in Table 1.

TABLE 1

| | | Embodiment 1 | Comparison example 1 |
|---|---|---|---|
| First member | | SUS | SUS |
| Second member | | PMMA | PMMA |
| Laser device for processing | | Pulse control | No pulse control |
| Perforation shape | Opening diameter R3 of the surface | 54 μm | 66 μm |
| | Opening diameter (inner diameter) R4 | 47 μm | No corresponding shape |
| | Opening diameter (inner diameter) R5 | 56 μm | No corresponding shape |
| | Depth | 60 μm | 32 μm |
| Bonding strength | Shearing direction | ○ | ○ |
| | Peeling direction | ○ | ○ |
| Appearance of the second member after bonding | | ○ | x |

A manufacturing method of the bonding structure 500 of the first embodiment is explained at first.

In the bonding structure 500 of the first embodiment, SUS304 is taken as a material of a first member 501, and ACRYLITE (registered trademark) manufactured by PMMA (MITSUBISHI RAYON) is used as a material of the second member 502. The first member 501 is formed into a plate shape, and has a length of 100 mm, a width of 29 mm and a thickness of 3 mm. The second member 502 is fainted into a plate shape, and has a length of 100 mm, a width of 25 mm and a thickness of 3 mm.

Besides, as shown in FIG. 7, laser irradiates a prescribed region R on the surface of the first member 501. The prescribed region R is an area bonded by the bonding structure 500, and is set into 12.5×20 mm. Besides, the irradiation of the laser is carried out by a fiber laser marker MX-Z2000 manufactured by Omron. The processing conditions of such laser are as follows:

<Laser Processing Conditions>
Laser: fiber laser (wavelength 1062 nm)
Oscillation mode: pulse oscillation (frequency 10 kHz)

Output: 3.8 W
Scanning speed: 650 mm/sec
Scanning times: 20 times
Irradiation interval: 65 μm
Sub-pulse number: 20

In addition, the frequency is a frequency of a pulse containing a plurality of sub-pulses (20 in this example). That is, in the irradiating condition, the laser (pulse), containing 20 sub-pulses, irradiates at an interval of 65 μm for ten thousands times while moving for 650 mm in one second. In addition, the scanning times are times that the laser irradiates a same part repeatedly.

In this way, by irradiating the laser containing a plurality of sub-pulses of one pulse, a perforation is formed in a prescribed region R of the first member 501, and in the perforation, the protrusion is formed in a position entering from the surface. That is, as shown in Table 1, an opening diameter R4 (referring to FIG. 4) is smaller than an opening diameter R3 (referring to FIG. 4) of the surface and smaller than an opening diameter R5 (referring to FIG. 4).

Besides, as shown in FIG. 8, the second member 502 is adjacently disposed in the prescribed region R of the first member 501, and under a condition of applying a prescribed pressure, the laser irradiates the prescribed region R from the second member side 502, therefore, the second member 502 is bonded with the first member 501. Bonding conditions of the laser are as follows:

<Laser Bonding Conditions>
Laser: semiconductor laser (wavelength 808 nm)
Oscillation mode: continuous oscillation
Output: 30 W
Focal point diameter: 4 mm
Scanning speed: 1 min/sec
Hermetic bonding pressure: 0.6 MPa In this way, the bonding structure 500 (referring to FIG. 9) of the first embodiment is manufactured.

Next, the manufacturing method of the bonding structure of the comparison example 1 is explained.

In the bonding structure of the comparison example 1, the materials of the first member and the second member use the same materials as the first embodiment. Besides, in the bonding structure of the comparison example 1, fiber laser without a pulse control function is used to form the perforation. That is, the perforation is formed by irradiating the laser, not containing a plurality of sub-pulses, of one pulse. Therefore, on the first member of the comparison example 1, the perforation with a mortar shape (conical) is formed. That is, as shown in Table 1, the protrusion that protrudes from the inside of the inner circumferential surface is not formed, and a shape corresponding to the opening diameter R4 and the opening diameter R5 of the first embodiment is not formed. Besides, in the comparison example 1, the bonding conditions of the laser are as follows.

<Laser Bonding Conditions>
Laser: semiconductor laser (wavelength 808 mm)
Oscillation mode: continuous oscillation
Output: 100 W
Focal point diameter: 4 mm
Scanning speed: 1 mm/sec
Hermetic bonding pressure: .06MPa Besides, for the bonding structure 500 of the first embodiment and that of the comparison example 1, the bonding strength and the appearance of the second member are evaluated.

In addition, the evaluation on the bonding strength is carried out by an electromechanical universal tester 5900 manufactured by Instron. Specifically speaking, the experiment is carried out at a tension speed of 5 mm/min in a shearing direction and a peeling direction (vertical direction), and the experiment is ended when the second member is broken or the boundary interface is broken. Besides, when the second member is broken, the bonding strength is evaluated to be qualified (o), and when the boundary interface is broken (peeled), the bonding strength is evaluated to be unqualified (x).

Besides, the appearance of the bonded second member is evaluated through visual inspection. Specifically speaking, the second member is qualified (o) when having no burn marks, colour change and deformation, and is unqualified when having the burn marks, colour change and deformation.

As shown in Table 1, in the bonding structure 500 of the embodiment 1, the bonding strength in the shearing direction and the peeling direction is both qualified, and the appearance of the second member 502 is also qualified because when the second member 502 is bonded with the first member 501, the irradiating laser is easily blocked inside the perforation by the protrusion, therefore, the energy of the laser for bonding is effectively converted into heat. Thus, the energy of the laser for bonding can be inhibited to a necessary minimal limit. That is, in the bonding structure 500 of the embodiment 1, the thermal deterioration of the second member 502 can be inhibited.

Relatively, in the bonding structure of the comparison example 1, the bonding strength in the shearing direction and the peeling direction is both qualified, but the second member has burn marks, and the appearance is unqualified because when the second member is bonded with the first member, the energy of the laser is difficultly converted into heat efficiently, and thus the energy of the laser (output of the laser for bonding) is set to be higher than that of the embodiment 1.

Experiment Example 2

In the experiment example 2, a bonding structure of the second embodiment corresponding to the second embodiment and a bonding structure of a comparison example 2 are manufactured and respective bonding strengths and an appearance of the second member are evaluated. The result is as shown in Table 2.

TABLE 2

| | | Embodiment 2 | Comparison example 2 |
|---|---|---|---|
| | First member | PBT | PBT |
| | Second member | PMMA | PMMA |
| | Laser device for processing | Pulse control | No pulse control |
| Perforation shape | Opening diameter R3 of the surface | 54 μm | 72 μm |
| | Opening diameter (inner diameter) R4 | 48 μm | No corresponding shape |
| | Opening diameter (inner diameter) R5 | 58 μm | No corresponding shape |
| | Depth | 67 μm | 35 μm |
| Bonding strength | Shearing direction | o | o |
| | Peeling direction | o | o |
| | Appearance of the bonded second member | o | x |

In the experiment example 2, the material of the first member is changed to be different from the experiment example 1. Specifically speaking, in the bonding structure of the experiment example 2, DURANEX (registered trademark 3316) manufactured by PBT (WinTech Polymer) is used as the material of the first member. Besides, along with the change of the material of the first member, the laser processing conditions of the embodiment 2 are changed as follows.

<Laser Processing Conditions>
Laser: fiber laser (wavelength 1062 nm)
Oscillation mode: pulse oscillation (frequency 10 kHz)
Output: 1.1 W
Scanning speed: 650 mm/sec
Scanning times: 3
Irradiating interval: 65 µm
Sub-pulse number: 3

Besides, the bonding conditions of the embodiment 2 are changed as follows.

<Laser Bonding Conditions>
Laser: semiconductor laser (wavelength 808 nm)
Oscillation mode: continuous oscillation
Output: 1.0 W
Focal point diameter: 4 mm
Scanning speed: 1 mm/sec
Hermetic bonding pressure: 0.6 MPa Besides, the bonding conditions of the comparison example 2 are changed as follows.

<Laser Bonding Conditions>
Laser: semiconductor laser (wavelength 808 nm)
Oscillation mode: continuous oscillation
Output: 2.5 W
Focal point diameter: 4 mm
Scanning speed: 1 mm/sec
Hermetic bonding pressure: 0.6 MPa The bonding structure of the embodiment 2 in which the protrusion is formed in the perforation, and the bonding structure of the comparison body 2 in which the protrusion is not formed in the perforation are manufactured in this way. In addition, an evaluation method on the bonding strength and the appearance is similar to that of the comparison example 1.

As shown in Table 2, in the bonding structure of the embodiment 2, the bonding strength in the shearing direction and the peeling direction is both qualified, and the appearance of the second member is also qualified. That is, under the condition of using the resin PBT as a material of the first member, by forming the perforation with the protrusion, the energy of the laser is effectively converted into heat. Thus, the energy of the laser can be inhibited to a necessary minimal limit, and the thermal deterioration of the second member can be inhibited.

Relatively, in the bonding structure of the comparison example 2, the bonding strength in the shearing direction and the peeling direction is both qualified, but the second member has burn marks, and the appearance is unqualified because when the second member is bonded with the first member, the energy of the laser is difficultly converted into heat efficiently, and thus the energy of the laser is set to be higher than that of the embodiment 2.

(Other Embodiments)

In addition, the embodiments disclosed herein are exampled in all aspects and are not a basis of a defining explanation. Therefore, a technical scope of the present invention is not explained through the embodiments merely but is defined based on a recording of a scope of claims. Besides, the technical scope of the present invention contains all changes in the meaning and scope equivalent to the scope of the claims.

For example, in the first embodiment, the surface 13 can be both flat and bent. In addition, the second embodiment 2 is also the same.

Besides, the first embodiment shows an example formed by a manner of connecting the expanding part 111 and the reducing part 112 but is not limited thereto, and a part extending straightforward along the depth direction can be formed between the expanding part and the reducing part. In addition, the second embodiment is the same.

Figure 10:
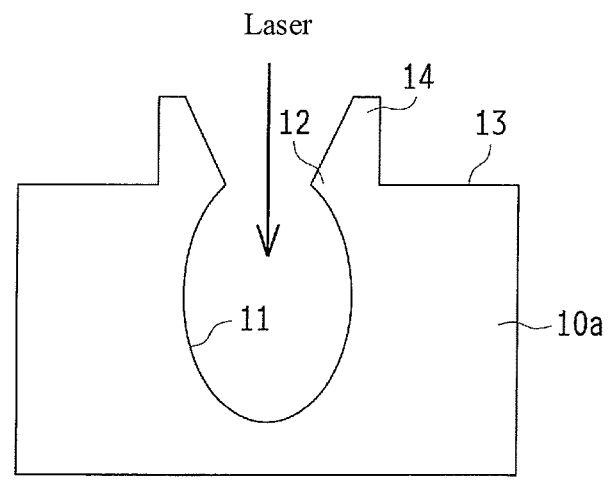
FIG. 10 is a schematic diagram of a first member of a first variable example of the first embodiment.

Besides, the first embodiment shows an example that the periphery of the perforation 11 is flat, but is not limited thereto, and can be like the first member 10a of the first variable example as shown in FIG. 10 that a bulging part 14 bulging toward the upper side from the surface 13 can be formed around the opening of the perforation 11. The bulging part 14 is formed in a manner of surrounding the perforation 11, and is approximately round when observed from a plane. The bulging part 14 for example is formed by accumulating the molten first member 10a when the laser, containing a plurality of sub-pulses, of one pulse irradiates. In addition, the second embodiment is the same.

Figure 11:
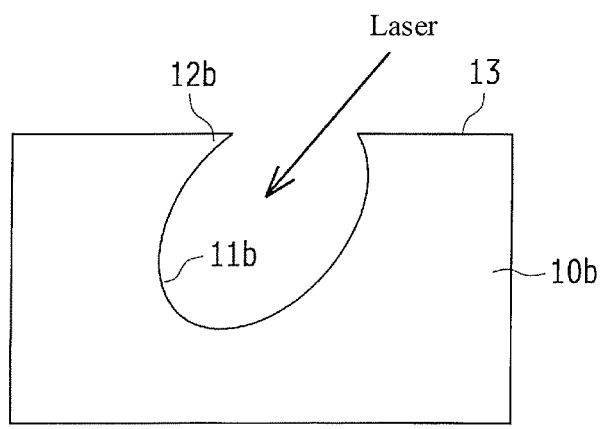
FIG. 11 is a schematic diagram of a first member of a second variable example of the first embodiment.

Besides, the first embodiment shows an example that the axis of the perforation 11 is vertical relative to the surface 13, but it not limited thereto, and can be like the first member 10b of a second variable example as shown in FIG. 11 that the axis of the perforation 11b is inclined relative to the surface 13. On the inner circumferential surface of the perforation 11b, a protrusion 12b that protrudes to the inside is formed. The perforation 11b for example is formed by inclining an irradiation direction of the laser relative to the surface 13 (more than 45° and smaller than 90°). Therefore, even under the condition that there is an obstacle during laser irradiating above the region where the perforation 11b is formed, the perforation 11b can also be formed. In addition, the second embodiment is the same.

Figure 12:
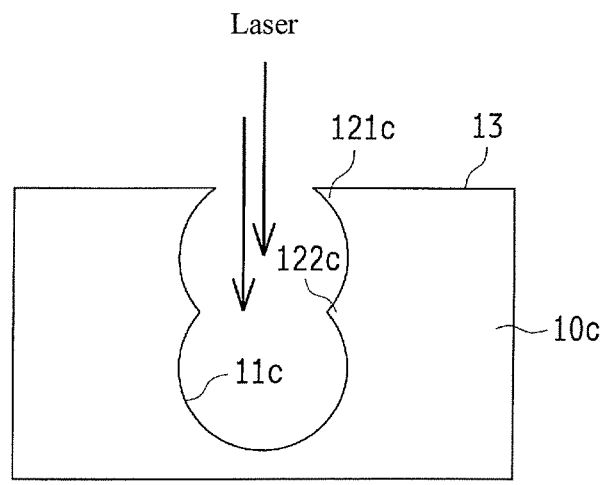
FIG. 12 is a schematic diagram of a first member of a third variable example of the first embodiment.

Besides, the first embodiment shows an example that the protrusion 12 is formed in the perforation 11, but is not limited thereto, and can be like a first member 10c of a third variable as shown in FIG. 12 that a plurality of protrusions 121c and protrusions 122c can be formed in the perforation 11c. The perforation 11c for example can be formed by changing an output condition of the laser and irradiating the laser to the same part. If constituted in this way, then a surface area of the perforation 11c is increased, therefore, the energy of laser for bonding can be more effectively converted into heat. In addition, in FIG. 12, more than three protrusions 121c and 122c can be formed. In addition, the second embodiment is the same.

Figure 13:
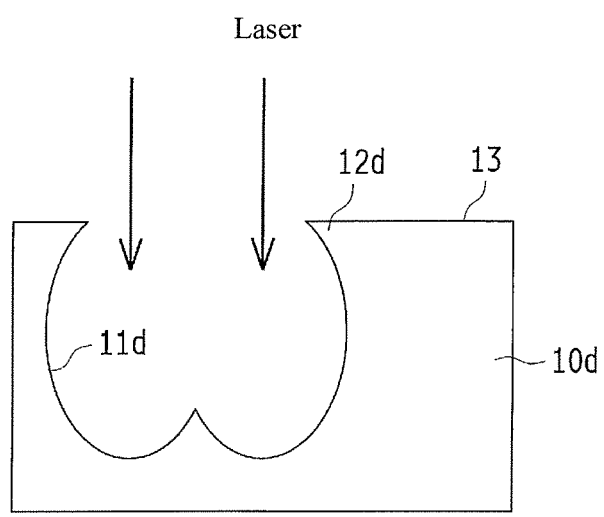
FIG. 13 is a schematic diagram of a first member of a fourth variable example of the first embodiment.

Besides, like a first member 10d of a fourth variable example of the first embodiment as shown in FIG. 13, one perforation 11d can be formed by irradiating the laser in staggered positions. That is, one perforation 11d can be formed by overlapping a part of the perforation formed by laser irradiating. On the inner circumferential surface of the perforation 11d, a protrusion 12d that protrudes to the inside is formed. Besides, the second embodiment is the same. Besides, the first to fourth variable examples can be properly combined.

INDUSTRIAL APPLICABILITY

The present invention can use a manufacturing method of a bonding structure bonded with a first member and a second member, which contain different materials, and the bonding structure.

What is claimed is:

1. A manufacturing method of a bonding structure in which a first member and a second member are bonded, comprising:

forming a perforation in a surface of the first member and forming a protrusion in the perforation, wherein the perforation is a non-through hole, and the protrusion protrudes away from an inner circumferential surface of the perforation and located at a top side of the perforation, wherein the protrusion that protrudes away from the inner circumferential surface of the perforation is formed by irradiating with a first laser in which one pulse is configured from a plurality of sub-pulses, a bulging part is formed surrounding the perforation and bulging away from the surface of the first member, and the bulging part is formed by accumulation of molten first member when the first laser irradiates;

disposing a region of the first member where the perforation is formed adjacent to the second member; and filling and curing the second member in the perforation of the first member by irradiating a second laser penetrating from the second member to the region of the first member where the perforation is formed, wherein the perforation has a first expanding part located at the top side of the perforation and connected to a first reducing part located at a bottom side of the perforation, the first expanding part has an increasing diameter in a depth direction, and the first reducing part has a reducing diameter in the depth direction, the inner circumferential surface of the first expanding part and the inner circumferential surface of the first reducing part have a curvy shape.

2. The manufacturing method of a bonding structure according to claim 1, wherein the first member is metal, thermoplastic resin or thermosetting resin.

3. The manufacturing method of a bonding structure according to claim 1, wherein the second member is resin through which the second laser transmits.

4. A bonding structure manufactured through the manufacturing method of a bonding structure according to claim 1.

5. A manufacturing method of a bonding structure, in which a first member and a second member are bonded, comprising:

forming a perforation in a surface of the first member and forming a protrusion in the perforation, wherein the perforation is a non-through hole;

forming a bulging part surrounding the perforation and bulging away from the surface of the first member;

disposing a region of the first member where the perforation is formed adjacent to the second member; and filling and curing the second member in the perforation of the first member by irradiating a first laser penetrating from the second member to the region of the first member where the perforation is formed, wherein the perforation has a first reducing pall, a first expanding part, and a second reducing part, the first reducing part is located at a top side of the perforation, the second reducing part is located at a bottom side of the perforation, the first expanding part is located between the first reducing part and the second reducing part, the protrusion protrudes away from an inner circumferential surface of the perforation and is located between the first reducing pail and the first expanding part, and the protrusion that protrudes away from the inner circumferential surface of the perforation is formed by irradiating with a second laser in which one pulse is configured from a plurality of sub-pulses, the bulging part is formed by accumulating molten first member when the second laser irradiates, the first reducing part has a decreasing diameter in a depth direction, the first expanding part has an increasing diameter in the depth direction, and the second reducing part has a reducing diameter in the depth direction, the inner circumferential surface of the first reducing part has a straight shape, the inner circumferential surface of the first expanding part and the inner circumferential surface of the second reducing part have a curvy shape.

6. The manufacturing method of a bonding structure according to claim 5, wherein the first member is metal, thermoplastic resin or thermosetting resin.

7. The manufacturing method of a bonding structure according to claim 5, wherein the second member is resin through which the first laser transmits.

8. A bonding structure manufactured through the manufacturing method of a bonding structure according to claim 5.

* * * * *